United States Patent
Tanahashi et al.

(10) Patent No.: US 6,808,824 B2
(45) Date of Patent: Oct. 26, 2004

(54) PERPENDICULAR MAGNETIC RECORDING MEDIA

(75) Inventors: Kiwamu Tanahashi, Kokubunji (JP); Atsushi Kikugawa, Higashimurayama (JP); Noboru Shimizu, Tokorozawa (JP); Yukio Honda, Fuchu (JP); Yuzuru Hosoe, Hino (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/225,158

(22) Filed: Aug. 22, 2002

(65) Prior Publication Data

US 2003/0099868 A1 May 29, 2003

(30) Foreign Application Priority Data

Nov. 27, 2001 (JP) .................................... P2001-360242

(51) Int. Cl.[7] ........................ G11B 5/667; G11B 5/738
(52) U.S. Cl. ................... 428/611; 428/668; 428/670; 428/686; 428/69.3; 428/336; 428/694 TS; 428/694 BS
(58) Field of Search ........................... 428/611, 668, 428/670, 686, 65.3, 336, 694 TS, 694 BS, 409, 694 TM

(56) References Cited

U.S. PATENT DOCUMENTS

| | | | |
|---|---|---|---|
| 5,750,270 A | * | 5/1998 | Tang et al. .................. 428/611 |
| 6,248,416 B1 | * | 6/2001 | Lambeth et al. ............ 428/65.3 |
| 2001/0038932 A1 | * | 11/2001 | Uwazumi et al. ....... 428/694 TS |
| 2002/0028355 A1 | * | 3/2002 | Nakamura et al. .... 428/694 TM |
| 2002/0101692 A1 | * | 8/2002 | Fullerton et al. ......... 360/324.2 |
| 2002/0197514 A1 | * | 12/2002 | Tanahashi et al. .... 428/694 TM |
| 2003/0049495 A1 | * | 3/2003 | Sakai et al. ........... 428/694 TM |
| 2003/0091868 A1 | * | 5/2003 | Shimizu et al. ....... 428/694 TM |

FOREIGN PATENT DOCUMENTS

| | | |
|---|---|---|
| JP | 6-103553 | 4/1994 |
| JP | 7-129946 | 5/1995 |
| JP | 11-191217 | 7/1999 |

* cited by examiner

*Primary Examiner*—Kevin M. Bernatz
(74) *Attorney, Agent, or Firm*—Mattingly, Stanger & Malur, P.C.

(57) ABSTRACT

There is provided a perpendicular magnetic recording medium comprising a non-magnetic layer having a face-centered cubic structure, an antiferromagnetic layer provided on the non-magnetic layer, a soft magnetic underlayer provided on the antiferromagnetic layer, and a perpendicular recording layer provided on the soft magnetic underlayer, which magnetic recording medium makes it possible to realize a recording density not less than 50 $Gb/in^2$ and makes the error rate thereof low while suppressing the spike noise.

8 Claims, 13 Drawing Sheets

EXCHANGE BIAS FIELD Hex

COERCIVITY Hc

CoFe-LAYER THICKNESS : 121–143nm

EXCHANGE BIAS FIELD Hex

COERCIVITY Hc

MEDIUM C

MEDIUM D

MEDIUM E

MEDIUM F

PERPENDICULAR MAGNETIC RECORDING MEDIA

BACKGROUND OF THE INVENTION

The present invention relates to a magnetic recording medium and a magnetic storage apparatus and, more particularly, to a magnetic recording medium having a recording density not less than 50 giga bits (Gb)/in$^2$ and a magnetic storage apparatus in which the magnetic recording medium is incorporated.

Since 1998, the areal recording density of a magnetic storage apparatus is raised by an increase rate of about 100%/year. However, as the areal recording density is raised, a problem of so-called thermal fluctuation comes to be caused in which magnetically recorded data disappear due to surrounding heat, so that the achieving of an areal recording density more than 50 Gb/in$^2$ is considered to be difficult insofar as a conventional longitudinal recording method is concerned.

On the other hand, a perpendicular recording method has, unlike the longitudinal recording method, the characteristic that, the more the linear recording density is raised, the more a demagnetizing field occurring among adjacent bits decreases, so that a recorded magnetization can be maintained to be stable. Further, in the perpendicular recording method, a high head magnetic field can be obtained by providing below a perpendicular recording layer a soft magnetic underlayer having a high permeability, whereby it becomes possible to enhance the coercivity of the perpendicular recording layer. Because of these reasons, the perpendicular recording method is considered to be one of effective means for overcoming the thermal fluctuation limit occurring in the longitudinal recording method.

In the perpendicular recording method, the combination of a single-pole-type head and double-layer perpendicular recording media each comprising a soft magnetic underlayer and a perpendicular recording layer is effective in realizing the high desity recording. However, since the double-layer perpendicular recording medium has the soft magnetic underlayer having a high saturation magnetic flux density (Bs), there occur such problems as a stray field occurring from the domain walls of the soft magnetic underlayer is observed as spike noises and as the recorded magnetization disappears due to the domain wall motion. To overcome these problems, it is proposed to provide a hard magnetic pinning layer between the soft magnetic layer and a substrate so that the magnetization of the soft magnetic layer is directed in one direction, as proposed, for example, in JP-A-7-129946 and JP-A-11-191217. Further, as disclosed in JP-A-6-103553, another method is proposed in which the domain wall motion of the soft magnetic underlayer is suppressed by an exchange coupling occurring in connection with an antiferromagnetic layer in which the direction of the magnetic spin is set in one direction.

SUMMARY OF THE INVENTION

The inventors of the invention have found that the prior art method in which the magnetization of the soft magnetic underlayer is directed in one direction by the hard magnetic pinning layer is apt to cause magnetic domains of the reverse direction at the inner and outer edges of a disk substrate with result that the spike noise occurring from these portions is observed. The inventors of the invention have further found that, although the other prior art method in which the domain wall motion of the soft magnetic underlayer is suppressed by the antiferromagnetic layer is effective in suppressing the disappearance of the recorded magnetization caused by the domain wall motion, it is impossible to suppress the spike noise caused by the domain walls.

The invention is made to solve the above problem occurring in the prior arts. More specifically, the object of the invention is to provide a perpendicular magnetic recording medium having a recording density not less than 50 Gb/in$^2$ and a high S/N ratio regarding the medium while suppressing the spike noise by controlling the magnetic domains of the soft magnetic underlayer, and to thereby make it easy to realize a magnetic storage apparatus of a high recording density.

According to the first aspect of the invention, there is provided a perpendicular magnetic recording medium comprising a non-magnetic layer having a face-centered cubic (, that is, fcc) structure, an antiferromagnetic layer provided on the non-magnetic layer, a soft magnetic underlayer provided on the antiferromagnetic layer, and a perpendicular recording layer provided above the soft magnetic underlayer.

A domain-control layer may be provided beneath the soft magnetic underlayer, whereby the spike noise from the soft magnetic underlayer is suppressed. The domain-control layer has a structure in which the ferromagnetic layer of a bcc structure is provided on the antiferromagnetic layer. As the material of the ferromagnetic layer of the bcc structure, there is preferred a material bringing about a large exchange coupling between the antiferromagnetic layer and the ferromagnetic layer, and more specifically it is possible to use a bcc alloy containing as the main constituent elements thereof Co (cobalt) and Fe (iron). In the composition of the CoFe alloy, the content of Fe may be not less than 20 atomic % but not more than 70 atomic % (, the atomic % being simply expressed below as "%"). Particularly, in a case where the content of Fe is not less than 30% but not more than 50%, the large exchange coupling can be obtained. The thickness of the crystalline ferromagnetic layer may be not less than 1 nm but not more than 10 nm, by which thickness range the crystal grains do not become coarse in size so much, so that the influence of the magneto-crystalline anisotropy can be suppressed.

By providing beneath the antiferromagnetic layer a non-magnetic layer having a fcc structure, it is possible to obtain such preferred effects as the crystalline texture of the antiferromagnetic layer is enhanced and as the grain size thereof can be controlled. As a specific material for the non-magnetic layer having the fcc structure, there may be used a fcc metal of the platinum group such as Pd (palladium), Pt (platinum) and Ir (iridium) etc. or a fcc alloy containing as the main constituent element thereof the metal of the platinum group. The non-magnetic layer having the fcc structure may be provided directly on the substrate, however, it is preferred to provide an amorphous or microcrystalline pre-coating layer between the substrate and the non-magnetic layer, which acts to enhance the adhesion of the layers.

It is preferred that the antiferromagnetic layer provided directly on the non-magnetic layer having the fcc structure is made of a material revealing an anti-ferromagnetism at the stage of forming the layer. Specifically, a disordered alloy can be used which contains Mn (manganese) and Ir as the main constituent elements thereof. In general, the ordered alloy such as a PtMn alloy and a NiMn alloy etc. is in a disordered state at film formation and does not reveal any anti-ferromagnetism. Thus, in order to obtain an exchange coupling between the antiferromagnetic layer and the crystalline ferromagnetic layer, it becomes necessary to perform an ordering heat treatment for several hours while applying a magnetic field. This step is not preferred because this step makes the recording medium-producing process complex and increases the production cost.

The material of the soft magnetic underlayer is not particularly limited insofar as the material having Bs not less than 1 Tesla (T), a coercivity not more than 1 Oe when measured in the direction of the travelling of a magnetic head and a superiority in surface flatness is concerned. Specifically, there can be used an amorphous or microcrystalline alloy containing as the main constituent element thereof Fe or Co and at least one additive selected from the group consisting of Ta, Hf, Nb, Zr, Si, B and C etc. Incidentally, in the SI unit system, 1 Oe is equivalent to 79.6 A/m.

The perpendicular recording layer provided above the soft magnetic underlayer through an intermediate layer can suppress the medium noise. The intermediate layer may be made of a non-magnetic alloy having an amorphous structure or an hexagonal closed packed (hcp) structure or a fcc structure. The intermediate layer may be a single-layer film or may be a bi-layer film comprising, for example, an amorphous alloy layer and a hcp alloy layer. The perpendicular recording layer may be made of a hcp-Co alloy such as an CoCrPt alloy, a CoCrPtB alloy and etc. or may be a multi-layer film of Co/Pd or Co/Pt.

According to the second aspects of the invention, there is provided a magnetic storage apparatus comprising the above-explained perpendicular magnetic recording medium, a driving unit for actuating the recording medium in a recording direction, a magnetic head having a recording section and a reproduction section, and means for relatively moving the magnetic head with respect to the perpendicular magnetic recording medium, recording and reproducing means for inputting the signals of the magnetic head or for performing the reproduction of the output signal from the magnetic head, the recording section of the magnetic head comprising a single-pole-type head, the reproduction section of the magnetic head being provided with a high sensitive element in which a magneto-resistive effect or a tunneling magneto-resistive effect is utilized, whereby it becomes possible to realize the magnetic storage apparatus having a recording density not less than 50 Gb/in$^2$ and a high reliablilty.

In the magnetic storage apparatus, the magnetic head may be provided with, as the reproduction section, a sensitive element using a magnetoresistive effect or a tunneling magnetoresistive effect.

According to the third aspect of the invention, there is provided a magnetic storage apparatus comprising a perpendicular magnetic recording medium, and a magnetic head provided with a reproduction section and a recording section, the perpendicular recording medium comprising an antiferromagnetic layer, a crystalline ferromagnetic layer provided directly on the antiferromagnetic layer, a soft magnetic underlayer provided directly on the crystalline ferromagnetic layer, and a perpendicular recording layer provided on the soft magnetic underlayer, the crystalline ferromagnetic layer having a bcc structure, the magnetic head comprising a single-pole-type head as the recording section.

In the magnetic storage apparatus according to the third aspect of the invention, the magnetic head may have, as the reproduction section, a sensitive element using a magnetoresistive effect or a tunneling magnetoresistive effect.

Other objects, features and advantages of the invention will become apparent from the following description of the embodiments of the invention taken in conjunction with the accompanying drawings.

DESCRIPTION OF THE PREFERRED EMBODIMENTS

The embodiments of the invention are described below.
Embodiment 1

A perpendicular magnetic recording medium according to the first embodiment of the invention comprises a substrate, a domain-control layer provided on the substrate, a soft magnetic underlayer, and a perpendicular recording layer, all of which are laminated in succession in this order. As the domain-control layer, there is used a bi-layer film comprising a non-magnetic layer of fcc structure and a antiferromagnetic layer, or a tri-layer film comprising a non-magnetic layer of fcc structure, a antiferromagnetic layer and a crystalline ferromagnetic layer. In addition, the medium is subjected to a heat treatment in a magnetic field.

Figure 1:
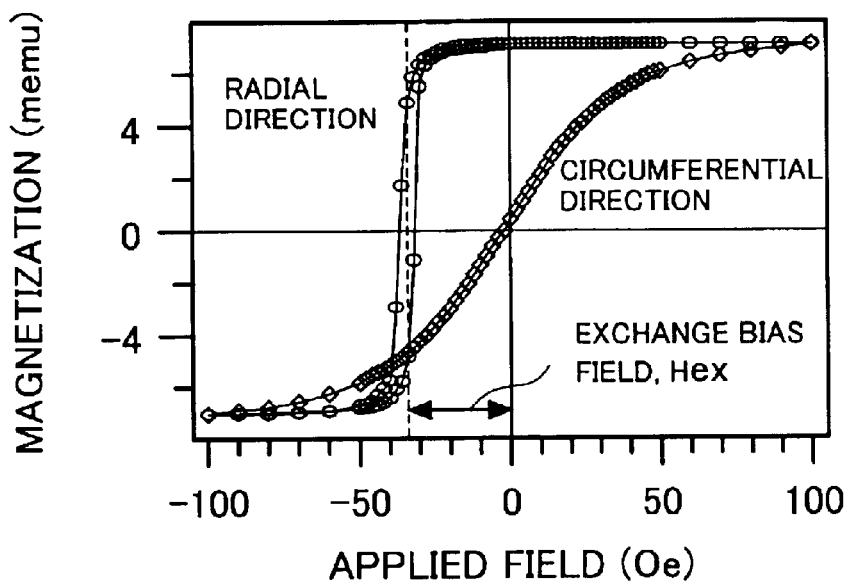
FIG. 1 is a graph showing magnetization curves of the soft magnetic underlayer.
Figure 2:
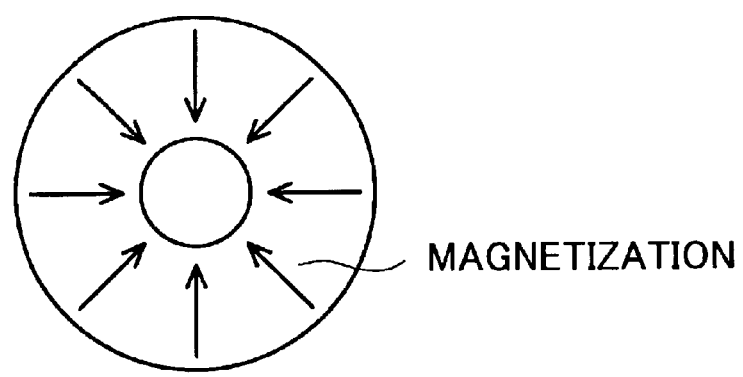
FIG. 2 is a schematic view showing a magnetization state of the soft magnetic underlayer.

The heat treatment in the magnetic field for controlling the domain structure of the soft magnetic underlayer is performed by the steps of performing, after forming the perpendicular recording layer, a heating at about a blocking temperature while applying a magnetic field in the radial direction of the disk substrate, and performing a cooling down to about 100° C. The magnitude of the applied magnetic field needs to be set to be a value in which the magnetization of the soft magnetic underlayer is at least substantially saturated, and more specifically, the magnetic field not less than about 200 Oe should be applied onto the disk substrate. As regards the cooling, it is preferred for the cooling to be performed down to a room temperature, however, it is practical to perform the cooling down to about 100° C. in taking the reduction in the production process time into consideration. In the soft magnetic underlayer to which the heat treatment in the magnetic field was applied, there are provided a uniaxial magnetic anisotropy in which the radial direction of the disk substrate becomes the easy axis of magnetization and a unidirectional magnetic anisotropy in which the direction of the magnetic field becomes the easy direction of magnetization. For example, in a case where the magnetic field applied during the cooling in the magnetic field is directed from the outer circumference of the disk to the inner circumference thereof along the radius of the disk, the magnetization of the soft magnetic underlayer is directed substantially toward the center of the disk with the exception of the edges of the outer and inner circumferences of the disk (as shown in FIG. 2). In this state, the magnetic walls are forced to the edges of the disk, so that a quasi-single domain is brought about, whereby it becomes possible to suppress the spike noise in the data area. In order to realize this domain-controlled state, it is at least necessary for the magnetization to have a sole value, that is, the hysteresis of the magnetization curve measured while applying a magnetic field in the direction of the radius of the disk is at least required not to cross the zero magnetic field axis. In other words, it is necessary to make the exchange bias field (Hex) (shown in FIG. 1), which is the shift amount in the direction of the magnetic field in the magnetization curve, high and to make the coercivity Hc small. By performing the heat treatment in the magnetic field while using the domain-control layer and the amorphous or microcrystalline soft magnetic underlayer, it becomes possible to simultaneously obtain both of the large Hex and the small Hc.

Figure 3:
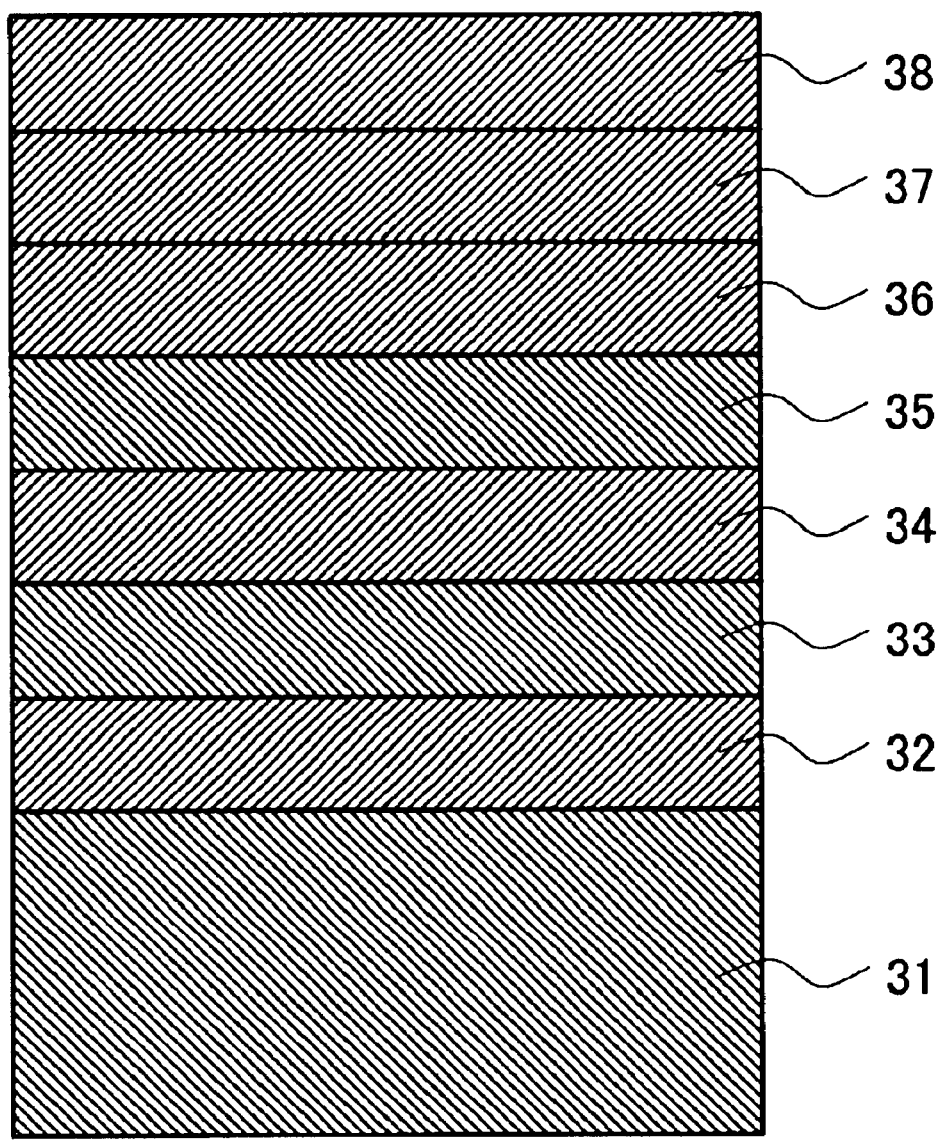
FIG. 3 is a sectional view showing a layered structure of a perpendicular recording medium according to one embodiment of the invention.
Figure 4:
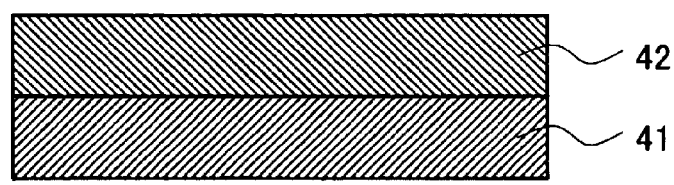
FIG. 4 is a sectional view showing a layered structure of a domain-control layer.

In FIG. 3 is disclosed the layered structure of the perpendicular magnetic recording medium according to the embodiment of the invention. The substrate 31 was made of an alkali-cleaned 2.5-inch glass disk, onto which substrate each of a precoat layer 32, a domain-control layer 33 and a softmagnetic underlayer 34 was formed in this order at a room temperature. Subsequently, the substrate was heated by use of a lamp heater, the intermediate layer 35 and the perpendicular recording layer 36 being formed, thereafter a cooling from about 250° C. to about 100° C. being performed in leakage magnetic field from a sputtering cathode, and at the final step a protective layer 37 was formed. The domain-control layer 33 was made to be a bi-layer film constituted by a non-magnetic layer 41 and an antiferromagnetic layer 42, as shown in FIG. 4. In Table 1 are shown the composition of each of targets used for producing the layers, an Ar (argon) gas pressure, and the thickness of each of the layers. The leakage magnetic field from the cathode was directed from the outer circumference of the disk to the inner circumference thereof along the radius of the disk, and the magnitude of the magnetic field was in the range of 200 Oe to 500 Oe on the disk substrate.

TABLE 1

|  | Target composition (at. %) | Ar gas pressure (Pa) | Film thickness (nm) |
| --- | --- | --- | --- |
| The precoat layer | Ni52.5Ta37.5Zr10 | 0.5 | 30 |
| The non-magnetic layer | Pd | 1.8 | 2.5–50 |
| The antiferromagnetic layer | Mn80Ir20 | 1.3 | 10 |
| The soft magnetic underlayer | Co92Ta3Zr5 | 0.5 | 100 |
| The intermediate layer | Ni52.5Ta37.5Zr10 | 0.5 | 5 |
| The perpendicular recording layer | Co64Cr22Pt14 | 0.5 | 20 |
| The protective layer | Carbon | 0.5 | 5 |

By forming, as the protective layer of the perpendicular recording layer, a film containing carbon as the main constituent thereof which film has a thickness not less than 3 nm but not more than 10 nm, and a lubricating layer of perfluoroalkylpolyethel etc. having a thickness not less than 1 nm but not more than 10 nm, it becomes possible to obtain a perpendicular magnetic recording medium with high reliability. In this embodiment, the protective layer 37 was constituted by a carbon film having a thickness of 5 nm and a lubricating layer 38 provided by coating the carbon film with a perfluoroalkylpolyethel material diluted with fluorocarbon.

Figure 5:
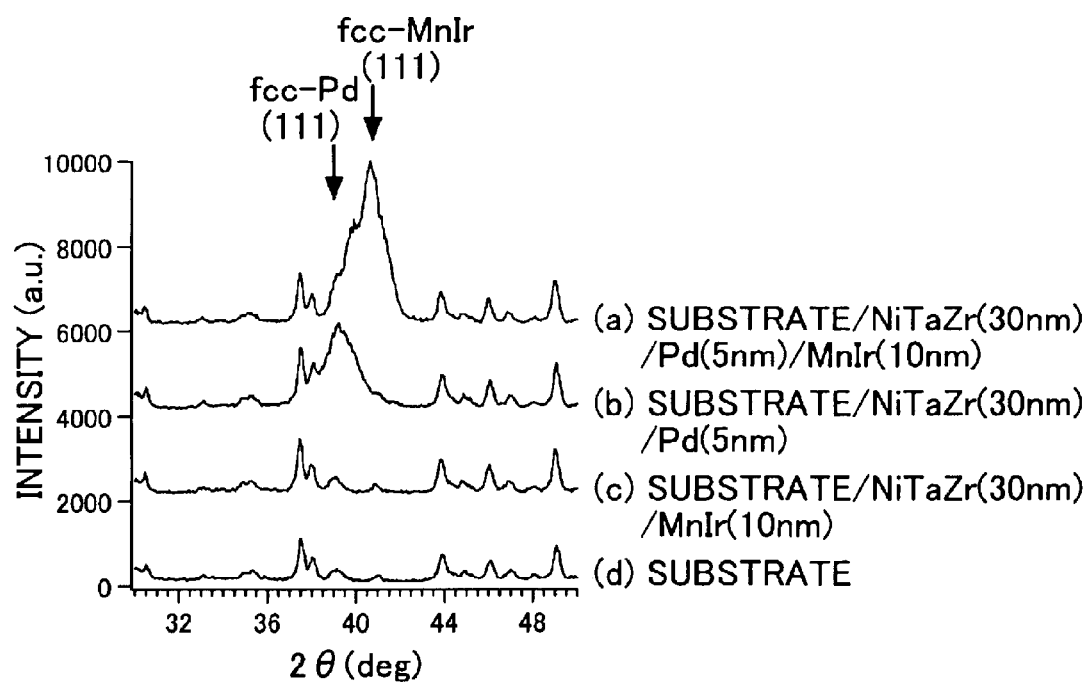
FIG. 5 is a graph showing the X-ray diffraction of the domain-control layers.

In FIG. 5 is shown the X-ray diffraction pattern of a sample in which the domain-control layer 33 of the bi-layer film is provided on the precoat layer 32. For comparison, there are also shown results regarding a comparative sample which has such a layered structure as only the antiferromagnetic layer 42 is removed from the layered structure of the above sample and regarding another comparative sample in which the antiferromagnetic layer 42 is provided directly on the precoat layer 32. In FIG. 5, it is confirmed that diffraction peaks from fcc-Pd(111) planes and fcc-MnIr (111) planes are observed together with diffraction peaks from the a glass-ceramic substrate used as the substrate 31. Namely, the (111) planes of Pd and the (111) planes of the fcc-MnIr grow on the amorphous precoat layer so that these planes may be in parallel with the plane of the film. On the other hand, in the comparative sample in which the antiferromagnetic layer 42 is provided directly on the precoat layer 32, no diffraction peak other than the diffraction peaks from the crystallized glass is observed. Thus, it is apparent that the (111) preferred orientation of the fcc-MnIr is realized by using the fcc-Pd as the non-magnetic layer.

Figure 6A:
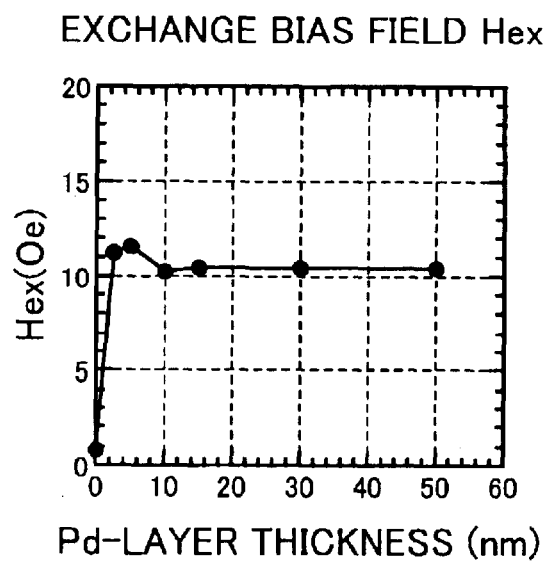
FIGS. 6a and 6b are graphs showing a relation between the exchange bias field and the Pd-layer thickness and another relation between the coercivity and the Pd-layer thickness, respectively.
Figure 6B:
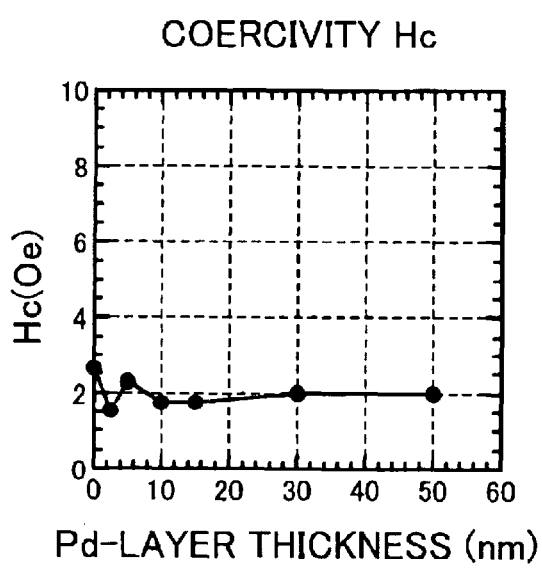

In FIG. 6a is shown a relation between the exchange bias field Hex and the Pd layer thickness. As apparent from the relation, the exchange bias field hardly occurs in a case where no Pd layer which is the non-magnetic layer 41 is used, however, the exchange bias field is observed by using the Pd layer having a thickness of only 2.5 nm, and at a Pd-layer thickness more than 2.5 nm, the value of Hex becomes substantially constant. As regards the value of the coercivity Hc, no remarkable variation thereof is observed even in a case of providing the Pd layer as shown in FIG. 6b. These results suggest that the exchange coupling between the antiferromagnetic layer 42 and the soft magnetic underlayer 43 is not acting in such a mode increasing Hex and Hc at the same time as to be observed in the bi-layer film of NiMn/NiFe. As explained above, in order to realize the quasi-single domain of the soft magnetic underlayer 34, it is necessary that the high value of Hex and the low value of Hc coexist, in view of which these characteristics of the exchange coupling are preferred.

Figure 7A:
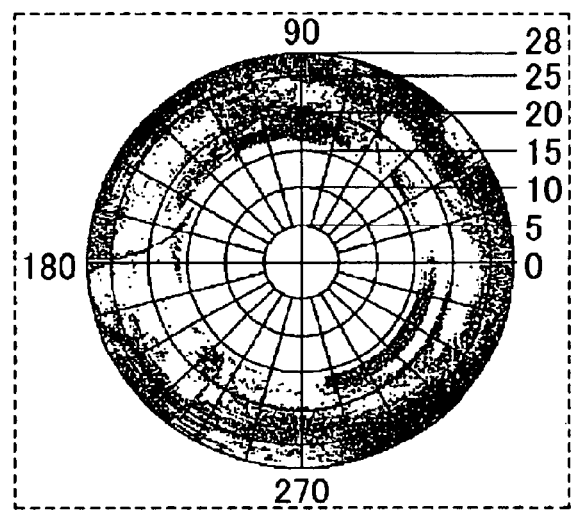
FIGS. 7a and 7b are graphs showing the distributions of the spike noise.
Figure 7B:
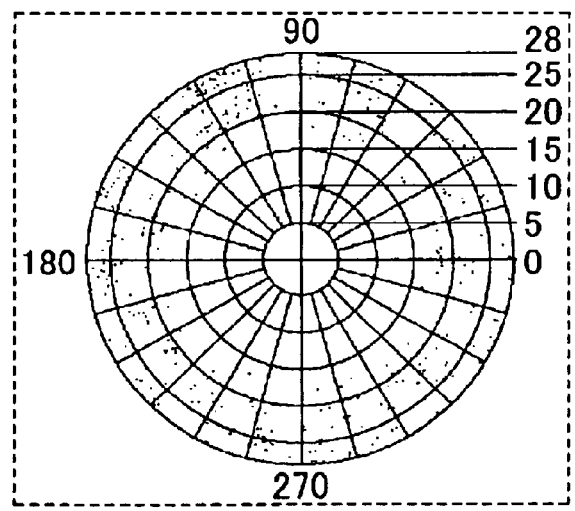

In FIGS. 7a and 7b is shown the change of spike noise distributions which is caused by the existence or non-existence of the domain-control layer 33. The spike noises were measured in the disk area between two circles defined by radii of 16 and 28 mm at a pitch of 100 μm by use of a spin stand and a digital oscilloscope. In a case of no domain-control layer being present (the medium A), spike noises were observed in the whole of the disk. However, in another case of providing the domain-control layer 33 (the medium B), no large spike noise was observed.

Thus, by providing the domain-control layer 33, it becomes possible to apply the exchange bias field to the soft magnetic underlayer, so that the spike noises can be suppressed significantly. In this embodiment, only the results brought about in the case of Pd used as the non-magnetic layer 41 is described, however, a result similar to that of Pd was obtained even in a case of using Pt which is a fcc metal belonging to the platinum group.

Embodiment 2

Figure 8:
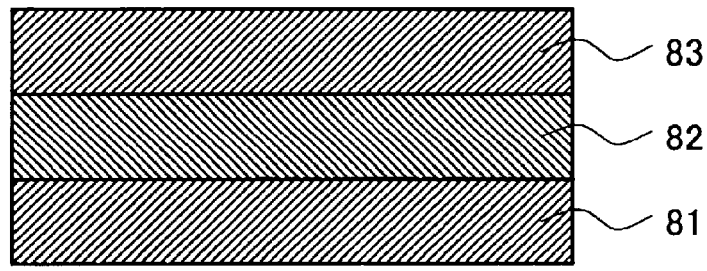
FIG. 8 is a sectional view showing a layered structure of another domain-control layer.

By using a layered structure similar to that of the perpendicular magnetic recording medium of Embodiment 1 and by using, as a domain-control layer 33, a tri-layer film constituted by a non-magnetic layer 81, an antiferromagnetic layer 82 and the crystalline ferromagnetic layer 83 as shown in FIG. 8, there was produced a perpendicular magnetic recording medium. In Table 2 are shown targets, Ar gas pressures and film thickness each of which was used for producing each of the layers. In this embodiment was also used the same medium-producing steps such as the heat treatment in a magnetic field and etc. as those in Embodiment 1.

TABLE 2

|  | Target composition (at. %) | Ar gas pressure (Pa) | Film thickness (nm) |
| --- | --- | --- | --- |
| The precoat layer | Ni52.5Ta37.5Zr10 | 0.5 | 30 |
| The non-magnetic layer | Pd | 1.8 | 2.5–50 |
| The antiferromagnetic layer | Mn80Ir20 | 1.3 | 7.5 |
| Crystalline ferromagnetic layer | Co | 0.5 | 1.0–30 |
|  | Co95Fe5 | 0.5 | 1.0–30 |
|  | Co90Fe10 | 0.5 | 1.0–30 |
|  | Co85Fe15 | 0.5 | 1.0–30 |
|  | Co80Fe20 | 0.5 | 1.0–30 |
|  | Co70Fe30 | 0.5 | 1.0–30 |
|  | Co60Fe40 | 0.5 | 1.0–30 |
|  | Co50Fe50 | 0.5 | 1.0–30 |
|  | Co30Fe70 | 0.5 | 1.0–30 |
| The soft magnetic underlayer | Co92Ta3Zr5 | 0.5 | 50–400 |
| The intermediate layer | Ni52.5Ta37.5Zr10 | 0.5 | 5 |
| The perpendicular recording layer | Co64Cr22Pt14 | 0.5 | 20 |
| The protective layer | Carbon | 0.5 | 5 |

Figure 9:
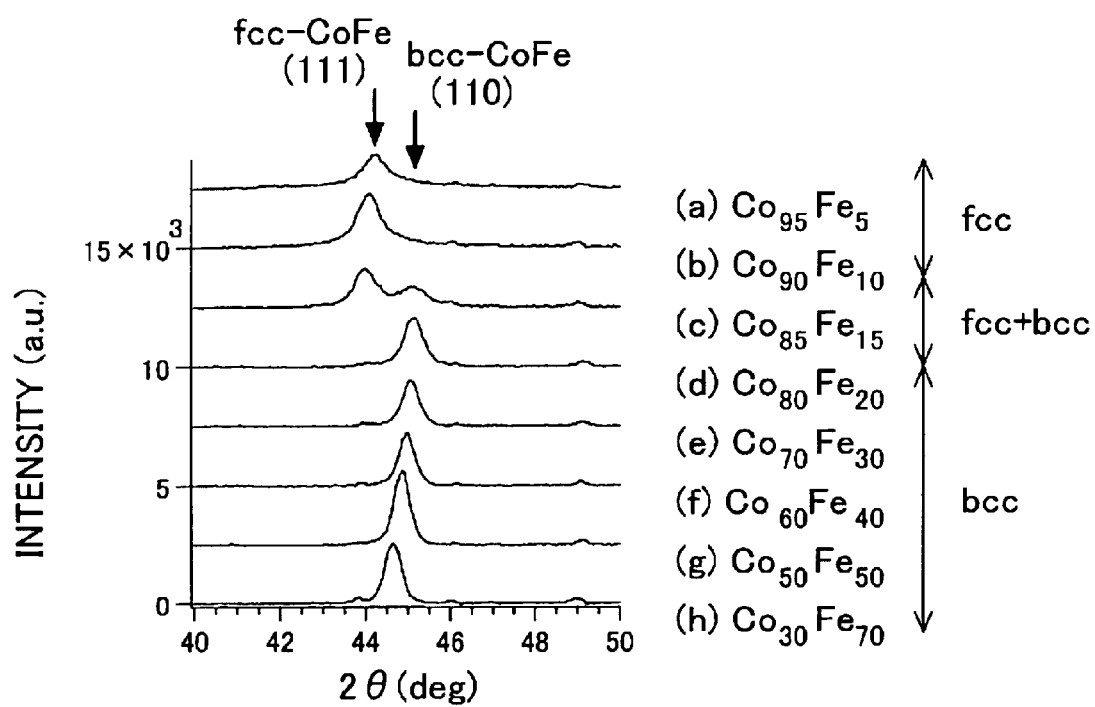
FIG. 9 is a graph showing the X-ray diffraction of the single layer films of a CoFe alloy.
Figure 10:
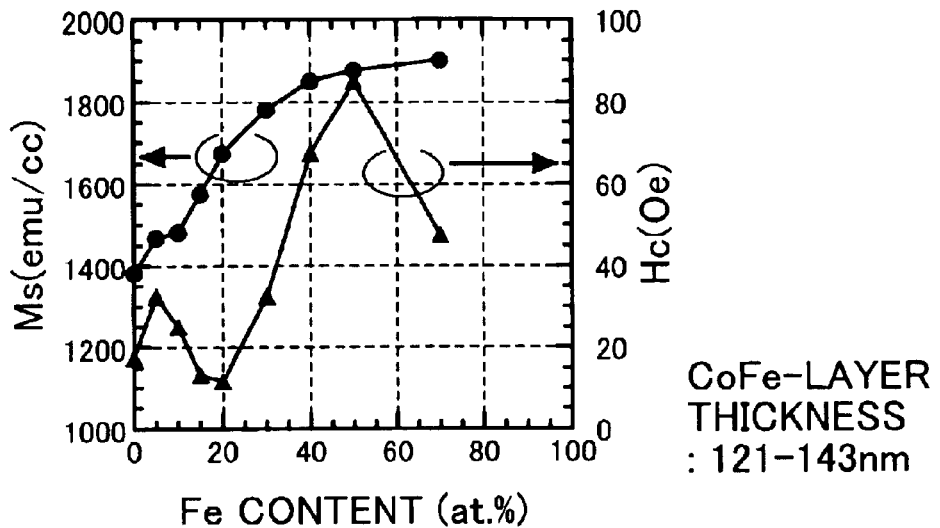
FIG. 10 is a graph showing relations between the saturation magnetization, the coercivity and the content of Fe in the CoFe alloy layer.

First, in order to appreciate the basic characteristics of the CoFe alloy used as the crystalline ferromagnetic layer 83, the crystal structure and magnetic properties of a single layer film having a thickness of about 120 nm were evaluated, the results of which are shown in FIGS. 9 and 10. In FIGS. 9 and 10, it is confirmed that, in a case where the content of Fe in the CoFe alloy is less than 10 at. %, the CoFe alloy has a fcc phase, that a mixture of fcc and bcc phases is present in another case where the Fe content is 15 at. %, and that a bcc phase comes to be present in a still another case where the Fe content is not less than 20 at. %. The saturation magnetization Ms thereof increases as the Fe content is raised, however, the coercivity Hc thereof becomes maximum at the Fe content of 50 at. %.

Figure 11:
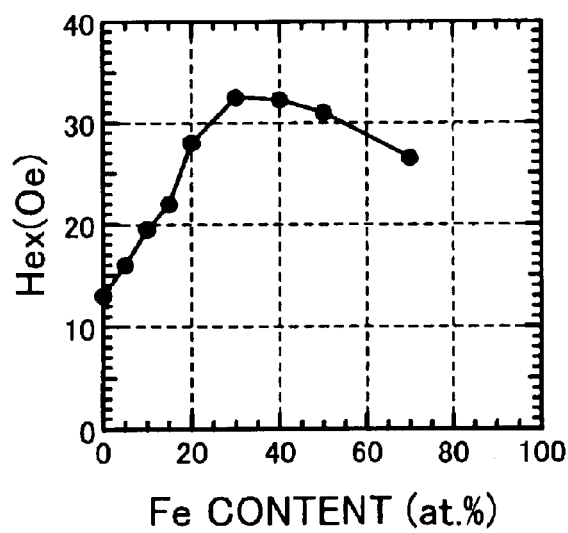
FIG. 11 is a graph showing a relation between the exchange bias field and the content of Fe in the CoFe alloy layer.

In FIG. 11 is shown a relation between the exchange bias field (Hex) and the Fe content regarding the CoFe alloy used as the material of the crystalline ferromagnetic layer 83, in which the film thickness of the crystalline ferromagnetic layer 83 is 5 nm and the film thickness of the soft magnetic underlayer 34 is 100 nm. As apparent from FIG. 11, the value of Hex increases as the Fe content is raised and becomes maximum in the Fe content range of 30 at. % to about 50 at. %. The range of the Fe content in which the high Hex value not less than 25 Oe can be obtained corresponds to the range in which the CoFe alloy becomes the single phase of the bcc phase. Since the value of Ms is high at this composition, it is thought that a large magnetic moment at the interface between the antiferromagnetic layer 82 and the CoFe alloy layer is one of the reasons for the enhancement of Hex.

Figure 12A:
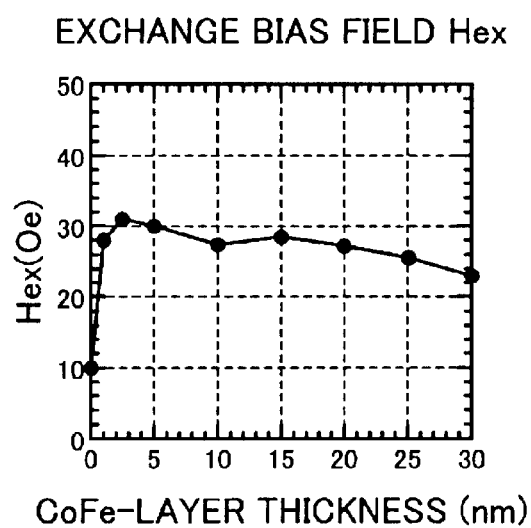
FIGS. 12a and 12b are graphs showing a relation between the exchange bias field and the CoFe-alloy-layer thickness and another relation between the coercivity and the CoFe-alloy-layer thickness, respectively.
Figure 12B:
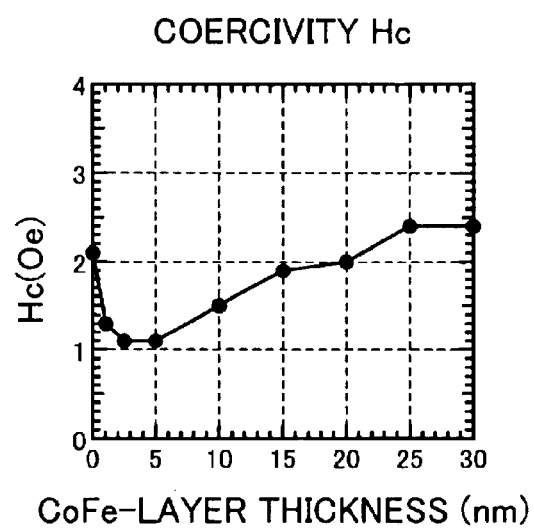

In FIGS. 12a and 12b are shown a relation between the exchange bias field Hex and the film thickness of the crystalline ferromagnetic layer 83 and another relation between the coercivity Hc and the film thickness of the crystalline ferromagnetic layer 83, respectively. The crystalline ferromagnetic layer 83 was made of Co70Fe30 (in which the numeral present after each of the atomic symbols indicates the content thereof expressed in terms of atomic %), and the film thickness of the soft magnetic underlayer 34 was 100 nm. By providing the Co70Fe30 layer of only 1 nm in thickness, the value of Hex is greatly improved, and it decreases gradually as the film thickness thereof increases. On the other hand, the value of Hc becomes minimum when the film thickness of the Co70Fe30 layer is in the range of 2.5 to 5 nm, and it increases gradually as the film thickness thereof increases therefrom. Thus, it is preferred that the film thickness of the crystalline ferromagnetic layer 53 is in the range not less than 1 nm but not more than 10 nm so that both of the high Hex value and the low Hc value may be obtained simultaneously. Further, in the case where the crystalline ferromagnetic layer 83 has such thin thickness as disclosed above, there occurs such an advantage as the surface flatness of the soft magnetic underlayer 34 is not deteriorated.

Figure 13:
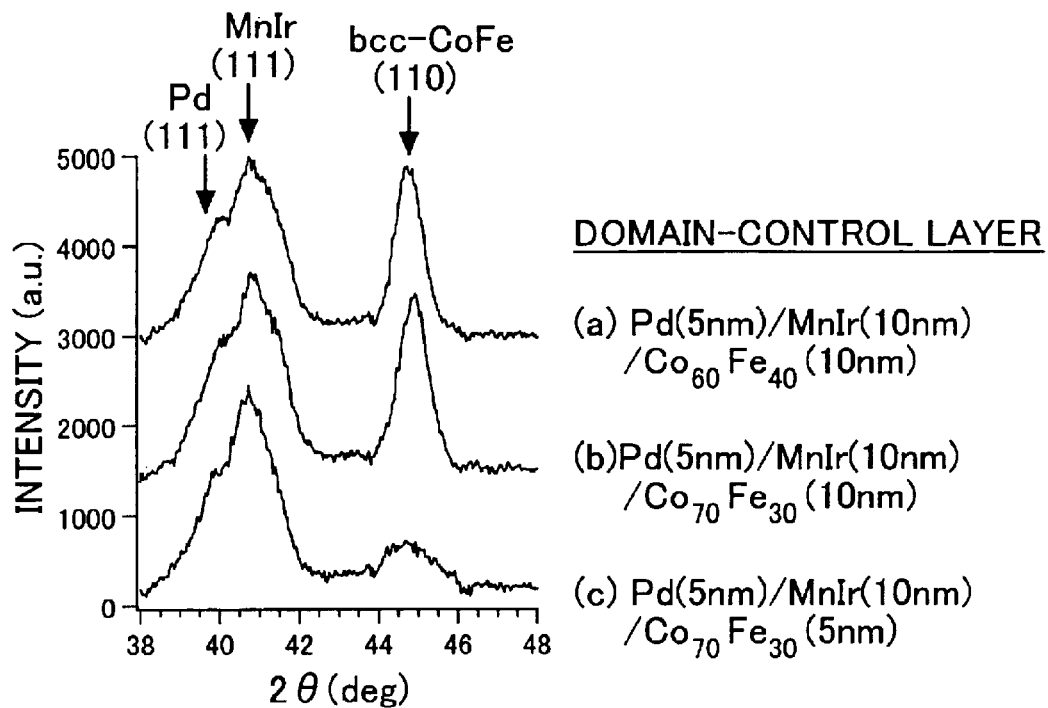
FIG. 13 is another graph showing the X-ray diffraction of the domain-control layers.

In FIG. 13 are shown X-ray diffraction patterns regarding samples in each of which the domain-control layer 33 of a tri-layer film is provided on the precoat layer 32. In FIG. 13, the diffraction peaks from the (110) planes of the bcc-CoFe layer are observedf, indicating that the Co60Fe40 and Co70Fe30 layers used as the crystalline ferromagnetic layer have bcc structures similarly to the case of the relatively thick single-layer film (FIG. 10). Further, even in the case where the film thickness of the Co70Fe30 layer is 5 nm, a similar diffraction peak from the (110) planes is observed. Incidentally, in the case of FIG. 13, the diffraction peaks of the crystallized glass is subtracted, which is different from the X-ray diffraction patterns shown in FIG. 5.

Figure 14:
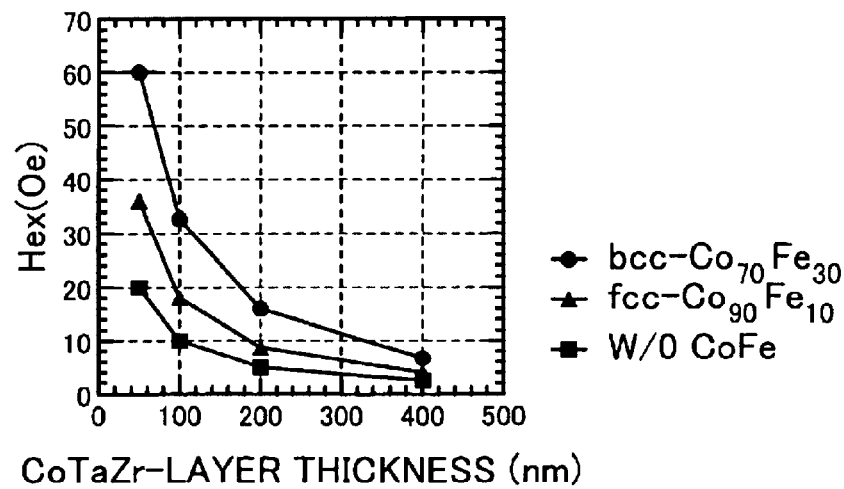
FIG. 14 is a graph showing a relation between the exchange bias field and the CoTaZr-layer thickness.
Figure 15A:
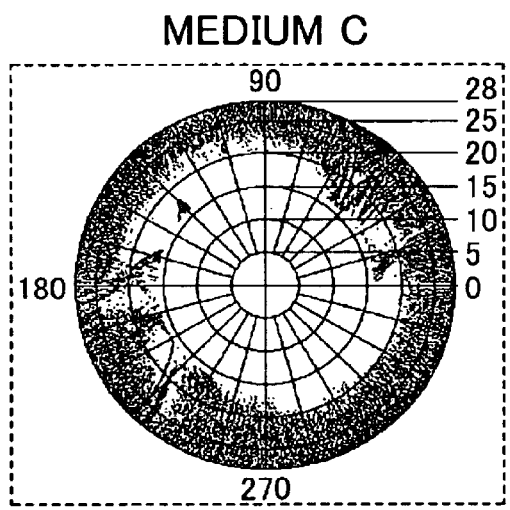
FIGS. 15a to 15d are graphs showing the spike noises.
Figure 15B:
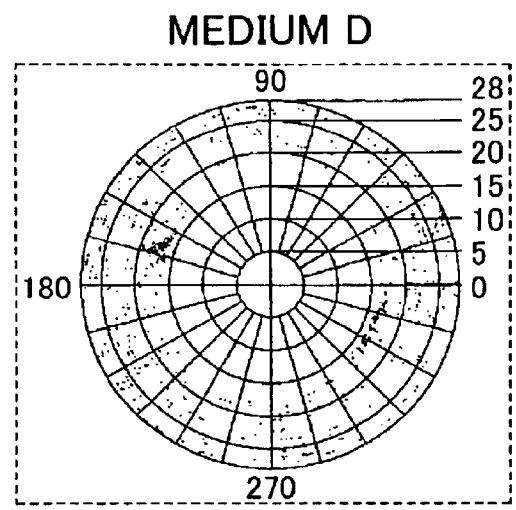
Figure 15C:
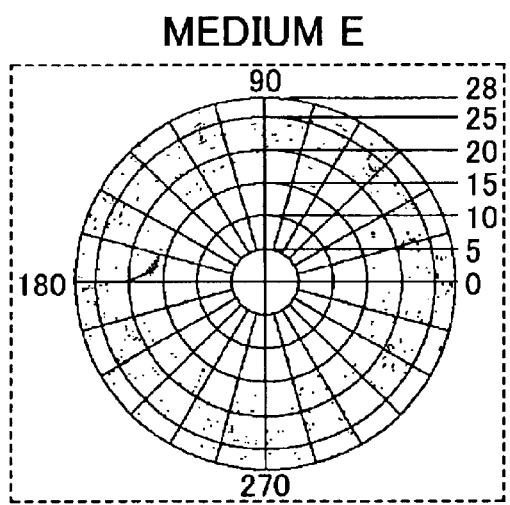
Figure 15D:
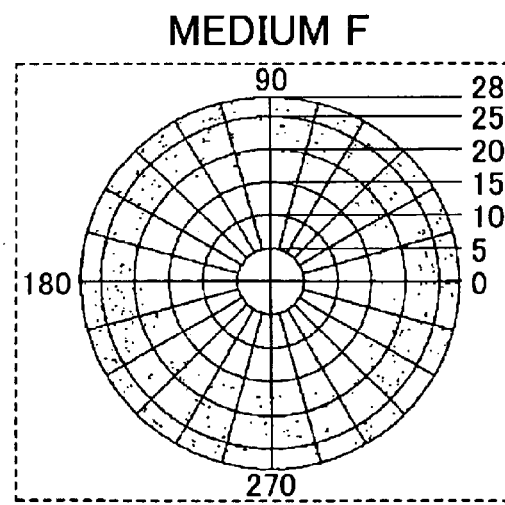

In FIG. 14 is shown a relation between the exchange bias field Hex and the film thickness of the soft magnetic underlayer 34. In this case, there are shown three cases, in the first case a Co90Fe10 layer of a fcc structure being used as the crystalline ferromagnetic layer, in the second case a Co70Fe30 layer of a bcc structure being used, and in the third case no crystalline ferromagnetic layer 83 is used. The value of Hex decreases in inverse proportion to the film thickness of the soft magnetic underlayer 34. In comparing when the film thickness of the soft magnetic underlayer 34 is 200 nm, a Hex value not less than 15 Oe can be obtained only in the case where the Co70Fe30 layer of a bcc structure is used. This difference in the Hex values causes the difference in the spike noise, the results of the evaluation as to how the spike noise varies because of this difference being shown in FIG. 15. In the cases where no crystalline ferromagnetic layer is provided (Medium D) and where the Co90Fe10 of the fcc structure is used (Medium E), the spike noise is greatly suppressed in comparison with the case where no domain-control layer is provided (Medium C), however, large, several spike noises are present. On the other hand, in the case where the Co70Fe30 layer of the bcc structure is used (Medium F), no large spike noise is observed over the whole face of a disk. Thus, by making the value of Hex large and more specifically by making the value of Hex be not less than 15 Oe, it becomes possible to suppress the spike noise over the whole face of the disk.

Figure 16:
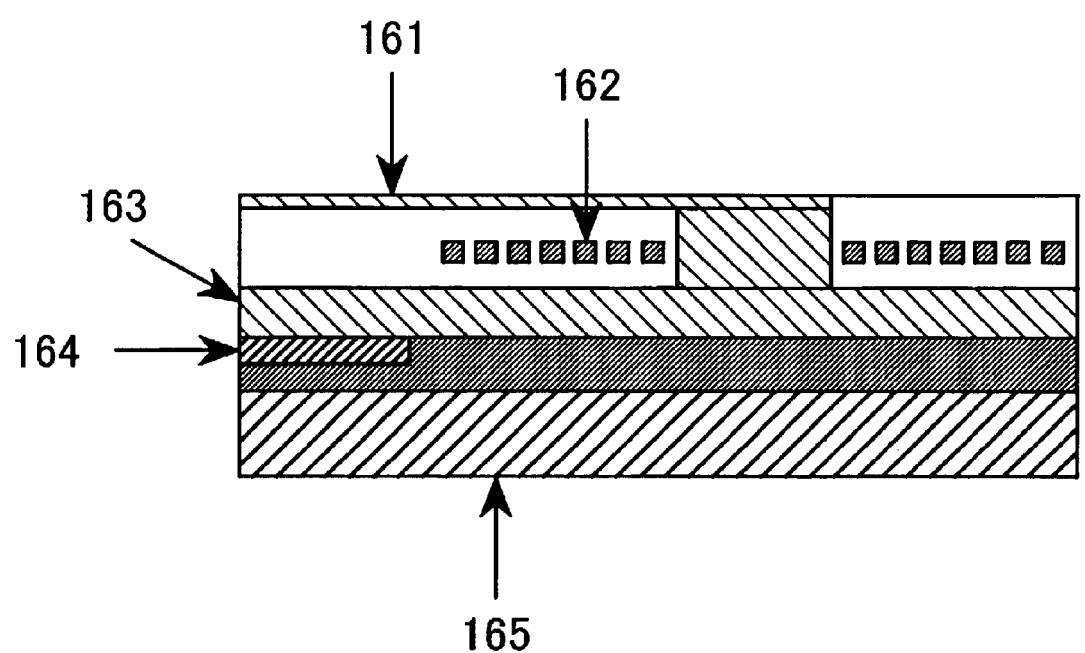
FIG. 16 is a sectional view schematically showing a recording-reproducing-separation type head.

By using the Medium F of this embodiment, a single-pole-type head having a track width of 0.25 μm which is used for recording, and a GMR head having a shield gap of 0.08 μm and a track width of 0.22 μm which is used for reproducing, the recording/reproducing was performed under a condition of a flying height of 10 nm. In performing an error-rate evaluation of the reproduced waveform of signals through a signal processing circuit of EEPR4 SYSTEM, an error-rate value not more than $10^{-6}$ was obtained under a condition of the areal recording density of 50 Gb/in². The recording/reproducing separation type head used in this evaluation has such a conventional structure as to have, as shown in FIG. 16, a main pole 161, a recording coil 162, an auxiliary pole/upper shield 163, a GMR element 164, and a lower shield 165.

Embodiment 3

Figure 17A:
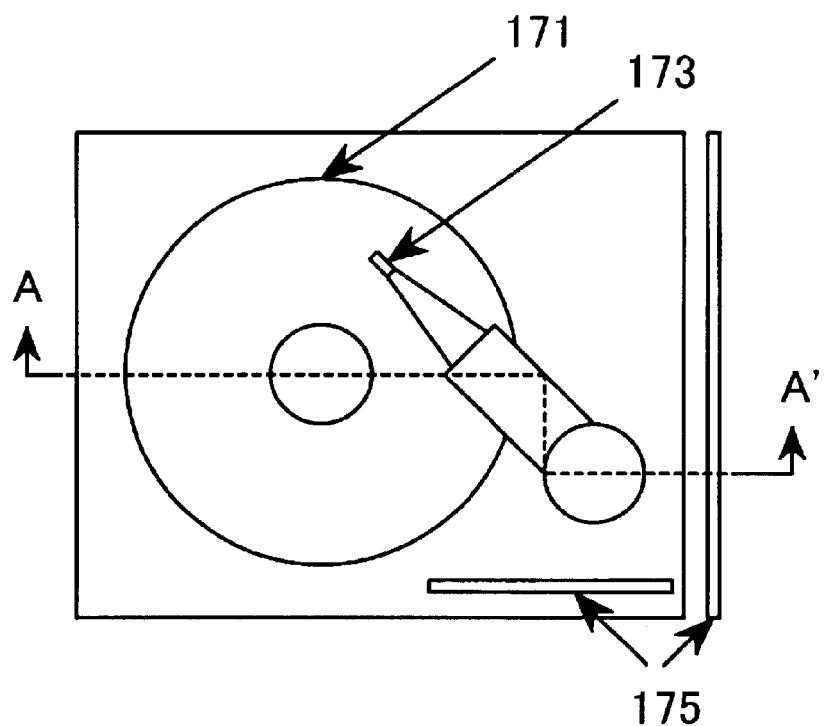
FIGS. 17a and 17b are a plan view schematically showing a magnetic storage apparatus according to the embodiment of the invention, and a vertical sectional view taken along line A–A' thereof, respectively.
Figure 17B:
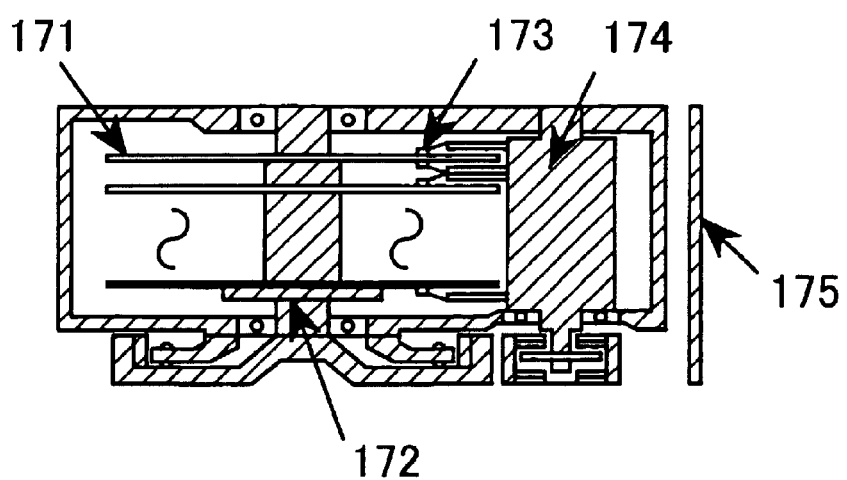

A magnetic storage apparatus embodying the invention is shown in FIG. 17. This magnetic storage apparatus has such a conventional constitution as to have perpendicular magnetic recording media 171, a driving portion 172 for rotationally driving the medium, magnetic heads 173 and driving means 174 therefor, and means 175 for processing the recording/reproducing signals of the magnetic heads. This magnetic head is one of a recording/reproducing separation type which is formed on a magnetic head slider. The track width of the recording head of a single-pole type was 0.25 μm, and the shield gap and track width of the GMR head for reproducing were 0.08 μm and 0.22 μm, respectively.

The media F produced in Embodiment 2 were incorporated in the magnetic storage apparatus described above, and the recording/reproducing characteristics thereof was evaluated in the conditions of the flying height of 10 nm, the linear recording density of 590 kBPI and the track density of 89 kTPI. As the result thereof, the magnetic storage apparatus was able to sufficiently meet the recording/reproducing characteristic specification of 52.5 Gb/in² at a temperature range of 10° C. to 50° C.

Embodiment 4

Figure 18:
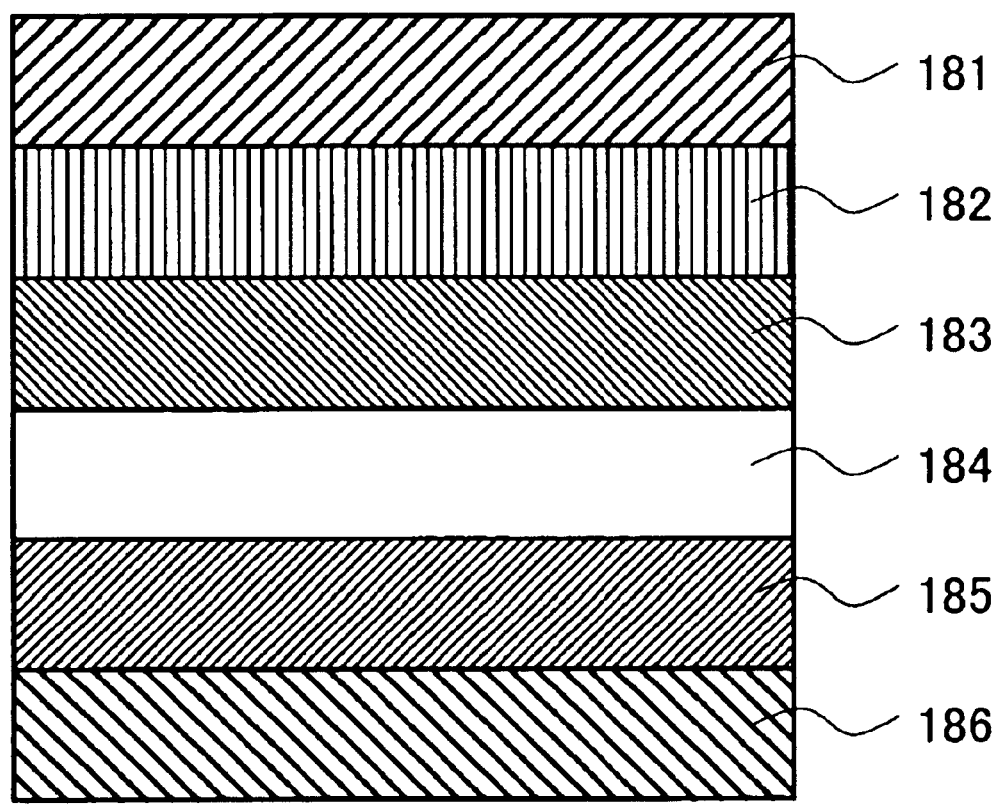
FIG. 18 is a sectional view showing the layered structure of a sensitive element using a tunneling magnetoresistive effect.

A magnetic storage apparatus was produced which has a constitution similar to the magnetic storage apparatus of Embodiment 3 and in which a sensitive element using a tunneling magnetoresistive effect was used as a reproducing head, and in this magnetic storage apparatus the media F produced in Embodiment 2 were incorporated. Regarding this magnetic storage apparatus, the recording/repoducing characteristics were evaluated in the conditions of the flying height of 10 nm, the linear recording density of 674 kBPI and the track density of 89 kTPI. As the result thereof, the magnetic storage apparatus was able to sufficiently meet the recording/reproducing characteristic specification of 60 Gb/in² at a temperature range of 10° C. to 50° C. The sensitive element using the tunneling magnetoresistive effect which is used in this evaluation had such a conventional constitution as to have, as shown in FIG. 18, an upper electrode 181, an antiferromagnetic layer 182, a pinned layer 183, an insulating layer 184, a free laye 185, and a lower electrode 186.

According to the invention, the magnetic storage apparatus can be realized, which has an excellent reliability with low error rate at an areal recording density not less than 50 Gb per square inch.

It should be understood by those skilled in the art that the foreging description has been made on the embodiments of the invention and that various changes and modifications may be made in the invention without departing from the spirit of the invention and the scope of the appended claims.

What is claimed is:

1. A perpendicular magnetic recording medium comprising an antiferromagnetic layer, a crystalline ferromagnetic layer provided directly on the antiferromagnetic layer, a soft magnetic underlayer provided directly on the crystalline ferromagnetic layer, and a perpendicular recording layer provided above the soft magnetic underlayer, said crystalline ferromagnetic layer having a body-centered cubic (bcc) structure and wherein said crystalline ferromagnetic layer has a thickness not less than 1 nm but not more than 10 nm.

2. A perpendicular magnetic recording medium according to claim 1, further comprising a disk substrate, wherein the magnetization curve of said soft magnetic underlayer, which is measured while applying a magnetic field in the radial direction of the disk substrate, is shifted in the direction of said magnetic field by not less than 15 Oe.

3. A perpendicular magnetic recording medium according to claim 1, further comprising a non-magnetic layer having a face-centered cubic (fcc) structure, the antiferromagnetic layer being provided on the non-magnetic layer, the soft magnetic underlayer being provided above the antiferromagnetic layer, and a perpendicular recording layer being provided on the soft magnetic underlayer, wherein said non-magnetic layer of the fcc structure is made of one selected from the group consisting of fcc metals of the platinum group and a fcc-alloy containing the metal of the platinum group as the main constituent element thereof.

4. A perpendicular magnetic recording medium according to claim 1, wherein said antiferromagnetic layer is made of a disordered alloy.

5. A perpendicular magnetic recording medium according to claim 1, wherein said disordered alloy contains Mn and Ir as the main constituent elements thereof.

6. A perpendicular magnetic recording medium according to claim 1, wherein said crystalline ferromagnetic layer is made of a bcc alloy containing Co and Fe as the main constituent elements thereof.

7. A perpendicular magnetic recording medium according to claim 6, wherein said bcc alloy contains Fe not less than 20 at.% but not more than 70 at.%.

8. A perpendicular magnetic recording medium according to claim 6, wherein said bcc alloy contains Fe not less than 30 at.% but not more than 50 at.%.

* * * * *